(12) United States Patent
Klinglesmith et al.

(10) Patent No.: US 12,204,462 B2
(45) Date of Patent: Jan. 21, 2025

(54) DOWNGRADING A PERMISSION ASSOCIATED WITH DATA STORED IN A CACHE

(71) Applicant: SiFive, Inc., San Mateo, CA (US)

(72) Inventors: Michael Klinglesmith, Chambéry (FR); Eric Andrew Gouldey, Fort Collins, CO (US); Wesley Waylon Terpstra, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 22 days.

(21) Appl. No.: 18/132,572

(22) Filed: Apr. 10, 2023

(65) Prior Publication Data

US 2024/0184718 A1 Jun. 6, 2024

Related U.S. Application Data

(60) Provisional application No. 63/429,918, filed on Dec. 2, 2022.

(51) Int. Cl.
*G06F 12/14* (2006.01)

(52) U.S. Cl.
CPC .. *G06F 12/1458* (2013.01); *G06F 2212/1052* (2013.01)

(58) Field of Classification Search
CPC ......... G06F 12/1458; G06F 2212/1052; G06F 12/0811
See application file for complete search history.

(56) References Cited

U.S. PATENT DOCUMENTS

| | | | |
|---|---|---|---|
| 2017/0123992 A1* | 5/2017 | Bradbury | G06F 12/0828 |
| 2017/0255571 A1* | 9/2017 | Dupont De Dinechin | G06F 12/0811 |
| 2023/0122423 A1* | 4/2023 | Chen | G06F 12/0802 711/118 |
| 2023/0161704 A1* | 5/2023 | Wang | G06F 12/0831 711/118 |
| 2024/0168887 A1* | 5/2024 | Huberty | G06F 12/0292 |

OTHER PUBLICATIONS

"SiFive TileLink Specification", SiFive, Inc., Aug. 21, 2017, Version 1.7-draft, pp. 2, 4-5. (Year: 2017).*

* cited by examiner

*Primary Examiner* — Rocio Del Mar Perez-Velez
*Assistant Examiner* — Tong B. Vo
(74) *Attorney, Agent, or Firm* — Kilpatrick Townsend & Stockton LLP

(57) ABSTRACT

Cache circuitry may be configured to receive a first message to downgrade a permission associated with data stored in a current level cache. For example, the current level cache could be a level two (L2) cache. The cache circuitry could receive the first message from a processor core having a level one (L1) cache. The cache circuitry may forward the first message to a higher level cache. For example, the higher level cache could be a level three (L3) cache. The cache circuitry may downgrade the permission associated with data stored in the current level cache based on receiving a second message from the higher level cache. The cache circuitry may forward the first message before receiving the second message and downgrading the permission. The second message may cause downgrade of the permission in multiple caches (e.g., the L1, L2, and L3 caches).

20 Claims, 11 Drawing Sheets

| Function | Encoding | Description |
|---|---|---|
| EXCLUSIVE | 0 | Dirty data must be written towards memory. All caches must not hold permissions outside {E, S, I}. |
| SHARED | 1 | Dirty data must be written towards memory. All caches must not hold permissions outside {S, I}. |
| INVALID | 2 | Dirty data must be written towards memory. All caches must not hold permissions outside {I}. |
| DISCARD | 3 | Dirty data must either be discarded or written towards memory. All caches must not hold permissions outside {I}. |

| Field | Width | Encoding |
|---|---|---|
| cid | c | The logical client identifier. |
| sid | s | The logical server identifier (optional). |
| ctag | t | The client-interface operation tag. |
| opcode | 3 | Must be Cmo (3). |
| function | 4 | The cache maintenance operation to perform. |
| acquire | 1 | The acquire ordering flag. |
| release | 1 | The release ordering flag. |
| address | a | The naturally aligned address of the access. |
| size | 4 | A block of $2^{size}$ bytes will be modified. |

804

| Field | Width | Encoding |
|---|---|---|
| cid | c | The logical client identifier. |
| ctag | t | The client-interface operation tag. |
| opcode | 3 | Must be Cmo (3). |
| denied | 1 | Operation denied flag. |

FIG. 8

DOWNGRADING A PERMISSION ASSOCIATED WITH DATA STORED IN A CACHE

CROSS-REFERENCE TO RELATED APPLICATION(S)

This application claims priority to and the benefit of U.S. Provisional Patent Application Ser. No. 63/429,918, filed Dec. 2, 2022, the entire disclosure of which is hereby incorporated by reference.

TECHNICAL FIELD

This disclosure relates generally to integrated circuits and, more specifically, to downgrading a permission associated with data stored in a cache.

BACKGROUND

A System-on-Chip (SoC) is an integrated circuit that includes multiple components connected to one another. The components may include, for example, processor cores, caches, cross bars, memory controllers, and memory-mapped devices. The components may be connected so that data can be transferred between them while adhering to a coherence policy, such as the MSI (modified, shared, invalid), MESI (modified, exclusive, shared, invalid), or MOESI (modified, owned, shared, exclusive, invalid) protocol. For example, the components can include agents that are connected to one another using TileLink, a chip-scale interconnect standard that provides multiple clients with coherent memory mapped access to memory and/or server devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a table illustrating functions that may be supported for downgrading a permission associated with data stored in a cache.

FIG. 8 is a table illustrating an example of fields associated with a cache request and a cache request acknowledgement message.

DETAILED DESCRIPTION

Figure 1:
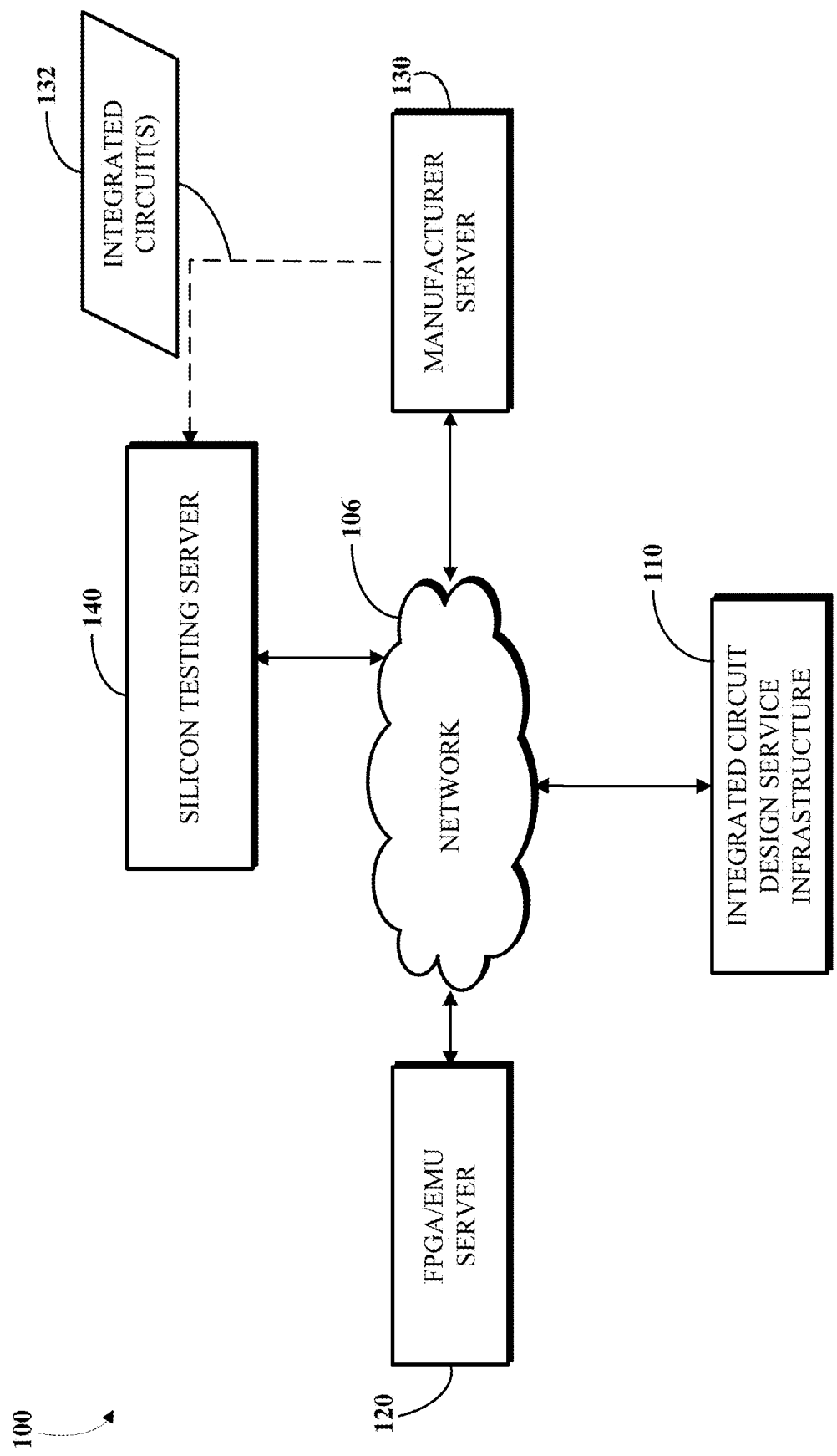
FIG. 1 is a block diagram of an example of a system for facilitating generation and manufacture of integrated circuits.

A system may include multiple levels of cache in a memory hierarchy, such as a level one (L1) cache, a level two (L2) cache, a level three (L3) cache, and a main memory. A processor core may transmit a cache maintenance operation (CMO) message to a cache in the memory hierarchy to request a downgrade of permissions associated with data stored in the cache. For example, downgrading permissions may include flushing or invalidating the data in the cache. The downgrade could be requested by software that the processor core is executing. As a request that originates from an inner agent in the hierarchy (further from main memory), the request may be transmitted using a lower priority channel, similar to read requests and write requests, as compared to other operations involving the inner agent which may be transmitted using a higher priority channel, such as data transmissions. However, while read and write requests on the lower priority channel involve an upgrade of permissions associated with data, such as moving shared (S) data into a cache, or transitioning data in a cache from a modified (M) state to an exclusive (E) state, the CMO message downgrades permissions associated with data. As a result, state machine logic associated with the lower priority channel may be complicated by having to resolve upgrades and downgrades of permissions at different times.

Implementations of this disclosure address problems such as these by propagating a cache maintenance operation (CMO, cache request, or request) message from an inner agent to an outer agent in a memory hierarchy without affecting the cache state in the memory hierarchy (e.g., depth first). A final coherence agent in the memory hierarchy (e.g., a root of the coherence tree, such as an outermost agent that is a cache) may then transmit a CMO probe message (CmoProbe, cache probe, or probe) that may be propagated back through the memory hierarchy to the inner agent. The probe message may cause the agents in the memory hierarchy to then change cache states. The cache request may be transmitted toward the root of the coherence tree using lower priority channels between agents (e.g., channel A), and the probe message may be transmitted back toward inner most agents using higher priority channels between agents (e.g., channel B). The probe message may be transmitted to multiple branches of the coherence tree, including the branch with the inner agent that transmitted the cache request (e.g., a path to the original CMO requester), to downgrade permissions in caches in downgrade paths. After cache probes complete in the tree, the final coherence agent may respond to the original CMO request with a CMO acknowledgment message (CmoAck, cache request acknowledgment, or acknowledgment). By downgrading permissions using messages transmitted on higher priority channels toward inner agents (and upgrading permissions using messages transmitted on lower priority channels toward outer agents), state machine logic implemented by the caches may be simplified.

To describe some implementations in greater detail, reference is first made to examples of hardware and software structures used to implement a system including components that may downgrade a permission associated with data stored in a cache. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
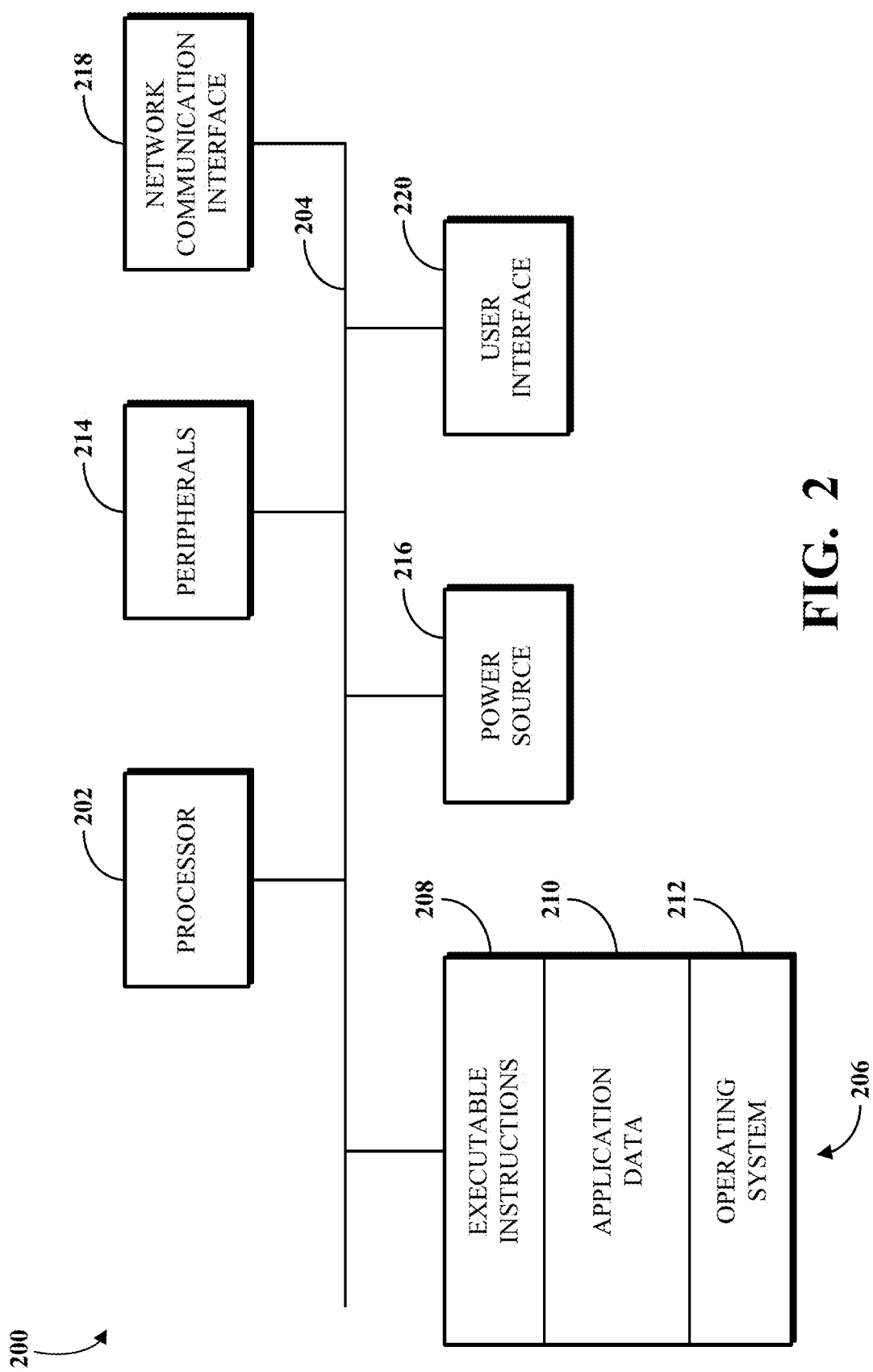
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
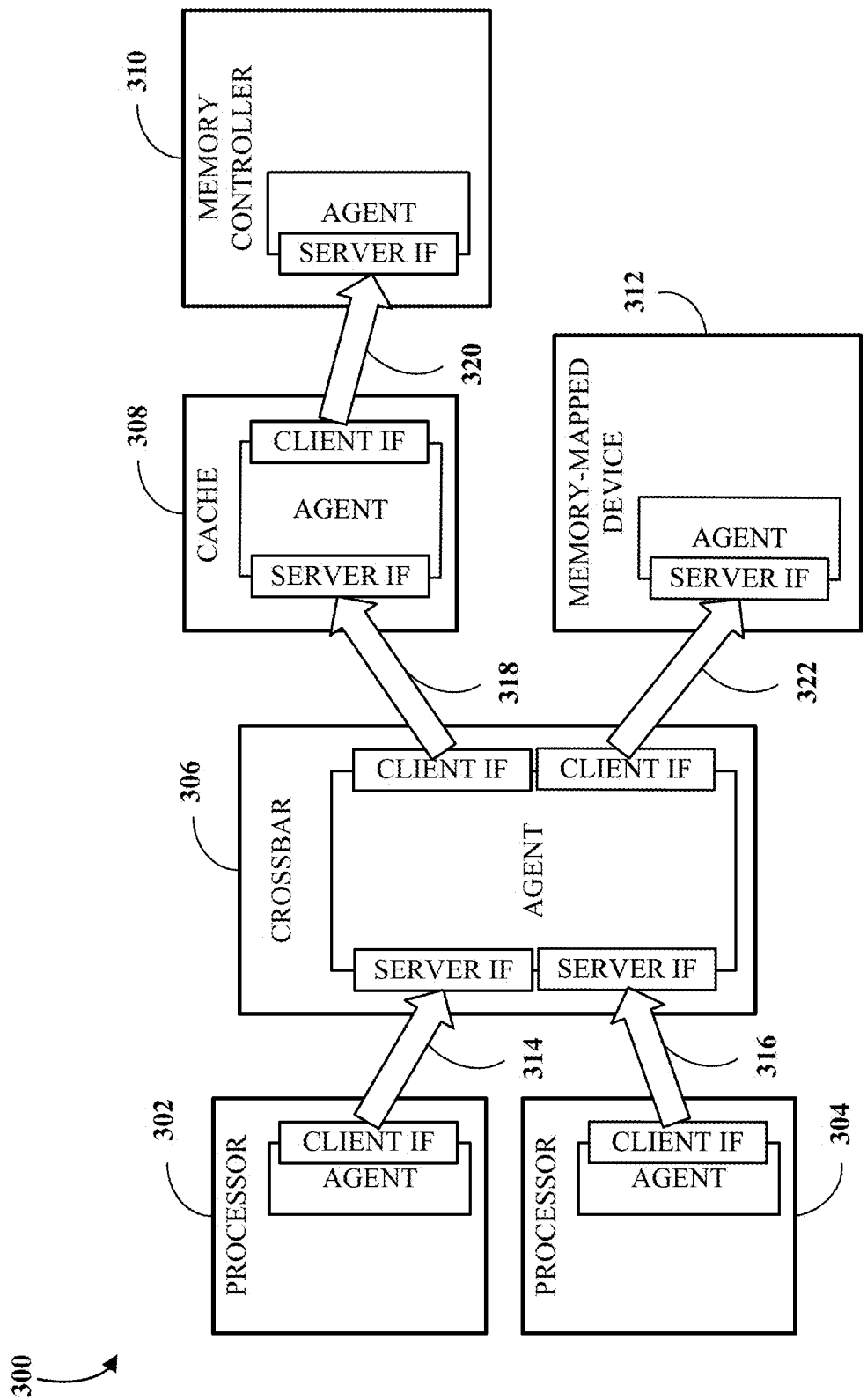
FIG. 3 is a block diagram of an example of a system including components that may downgrade a permission associated with data stored in a cache.

FIG. 3 is a block diagram of an example of a system 300 including components that may downgrade a permission associated with data stored in a cache. The system 300 could be implemented, for example, by an SoC. The components may include, for example, a first processor core 302 (e.g., which may include a private cache, implementing a data storage such as an SRAM), a second processor core 304 (e.g., which may include another private cache, implementing another data storage such as another SRAM), a cross bar 306, a cache 308 (e.g., a shared cache, implementing another data storage such as another SRAM), a memory controller 310 (e.g., a memory, implementing a data storage such as a DRAM), and a memory-mapped device 312. The components may be connected so that data stored in cache blocks can be transferred between them while adhering to a cache coherence policy, such as one of the MSI, MESI, or MOESI policies. For example, the components can include agents that are connected to one another so that messages involving data can be transferred between them (e.g., sending and receiving) while adhering to the cache coherence policy. For example, the agents may be connected to one another using TileLink, a chip-scale interconnect standard that provides multiple masters with coherent memory mapped access to memory and/or server devices.

The agents implemented by the components may implement point-to-point links for communicating the messages to one another. The messages may include, for example, messages associated with requests (e.g., requests for data, evictions of data, and probes for data), responses (e.g., transferring data), and acknowledgements. An agent may implement one or more client interfaces and/or one or more server interfaces for communicating the messages. An agent with a client interface (e.g., a client agent) may request an agent with a server interface (e.g., a sever agent) to perform memory operations, or may request permission to transfer and cache copies of data. An agent with a server interface may manage permissions and access to a range of addresses, including performing memory operations on behalf of requests arriving from a client interface. Thus, connected agents may send and receive messages over links to perform operations on shared address space, such as fill operations, probe operations, and evict operations.

For example, in the system 300, the first processor core 302 and the second processor core 304 may each include an agent having a client interface. The cross bar 306 may include an agent having a first server interface, a second server interface, a first client interface, and a second client interface (e.g., the cross bar 306 may be a server and a client, or servent). The client interface of the first processor core 302 may connect to the first server interface of the cross bar 306 by a link 314. The client interface of the second processor core 304 may connect to the second server interface of the cross bar 306 by a link 316. The cache 308 may include an agent having a server interface and a client interface (e.g., the cache 308 may also be a servent). The first client interface of the cross bar 306 may connect to the server interface of the cache 308 by a link 318. The memory controller 310 may include an agent having a server interface. The client interface of the cache 308 may connect to the server interface of the memory controller 310 by a link 320. The memory-mapped device 312 may include an agent having a server interface. The second client interface of the cross bar 306 may connect to the server interface of the memory-mapped device 312 by a link 322. The agents implemented by the first processor core 302, the second processor core 304, the cross bar 306, the cache 308, the memory controller 310, and the memory-mapped device 312, may send and receive messages over their respective links (e.g., the links 314, 316, 318, 320, and 322) to perform operations on shared address space.

Figure 4:
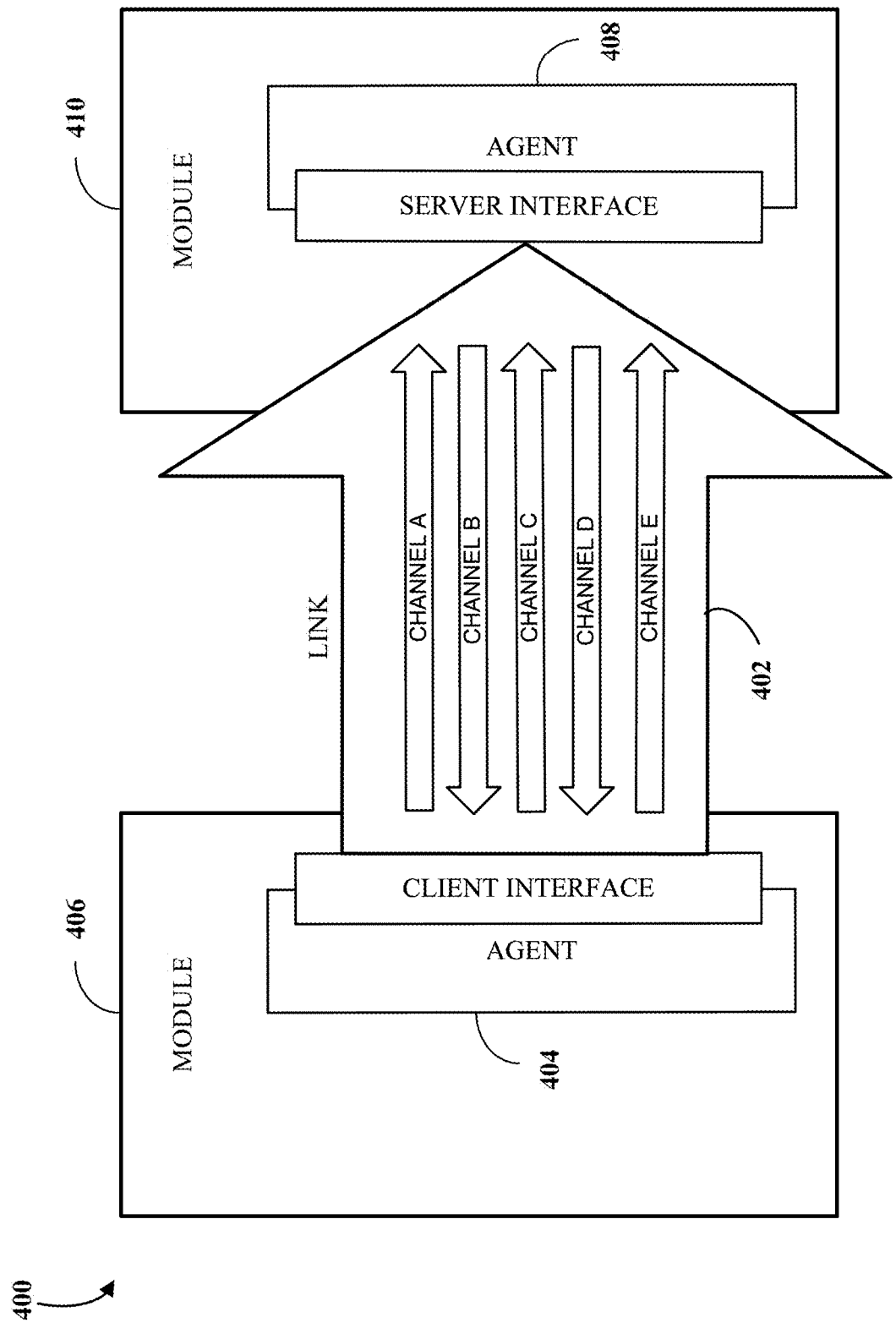
FIG. 4 is a block diagram of an example of a link between agents implemented by components.

FIG. 4 is a block diagram of an example of a link 402 between agents implemented by components in a system 400, such as an agent 404 implemented by a first component 406 and an agent 408 implemented by a second component 410. For example, the link 402 could be one of the links, 314, 316, 318, 320, or 322 shown in FIG. 3. The link 402 may be used to downgrade a permission associated with data stored in a cache.

The agent 404 implemented by the first component 406 may include a client interface (e.g., the agent 404 may be a client agent that is also an inner agent), and the agent 408 implemented by the second component 410 may include a server interface (e.g., the agent 408 may be a server agent that is also an outer agent). For example, the first component 406 could be the first processor core 302, and the second component 410 could be the cross bar 306, the cache 308, or the memory controller 310. The client interface of the agent 404 may connect to the server interface of the agent 408 by the link 402. The connected agents 404 and 408 may send and receive messages to one another over point-to-point channels of the link 402, such as one of the Channel A through E implemented by the link 402. For example, the agents 404 and 408 may send and receive messages to perform operations on a shared address space, such as fill operations, probe operations, and evict operations. An operation may include, for example, a change to an address range's data values, permissions, or location in a memory hierarchy. A message may include a set of control and data values sent over a particular channel (e.g., one of the Channel A through E). The channels may be logically independent from one another for communicating the messages. A priority may be specified among the channels, such as a prioritization in which messages on Channel A have a lowest priority with messages on Channel E having a highest priority (e.g., a prioritization of Channels A<B<C<D<E for messages across the channels). The channels may contain transaction control signals and a bus for exchanging data (e.g., a physical bus implemented by wires and having a particular data width, such as 128 bits). The channels may be directional, in that each channel may pass messages either from a client interface to a server interface or from a server interface to a client interface.

For example, Channel A may enable the agent having the client interface (e.g., the agent 404) to transmit a request to the agent having the server interface (e.g., the agent 408), such as a request that an operation be performed on a specified address range, such as accessing or caching data, or evicting data with a lower priority (e.g., a low priority evict). Channel B may enable the agent having the server interface (e.g., the agent 408) to transmit a request to the agent having the client interface (e.g., the agent 404), such as a request that an operation be performed at an address cached by a client (e.g., the agent 404), such as for accessing or writing back cached data or probing cached data at an address (e.g., a probe). Channel C may enable the agent having the client interface (e.g., the agent 404) to transmit to the agent having the server interface (e.g., the agent 408) data, an acknowledgment message in response to the request, or evicting data with a higher priority (e.g., a high priority evict). Channel D may enable the agent having the server interface (e.g., the agent 408) to transmit a data response or acknowledgement message back to the client (e.g., the agent 404). Channel E may enable the agent having the client interface (e.g., the agent 404) to transmit back to the agent having the server interface (e.g., the agent 408) a final acknowledgment of a cache line or block transfer from the requestor (e.g., the agent 404).

Figure 5:
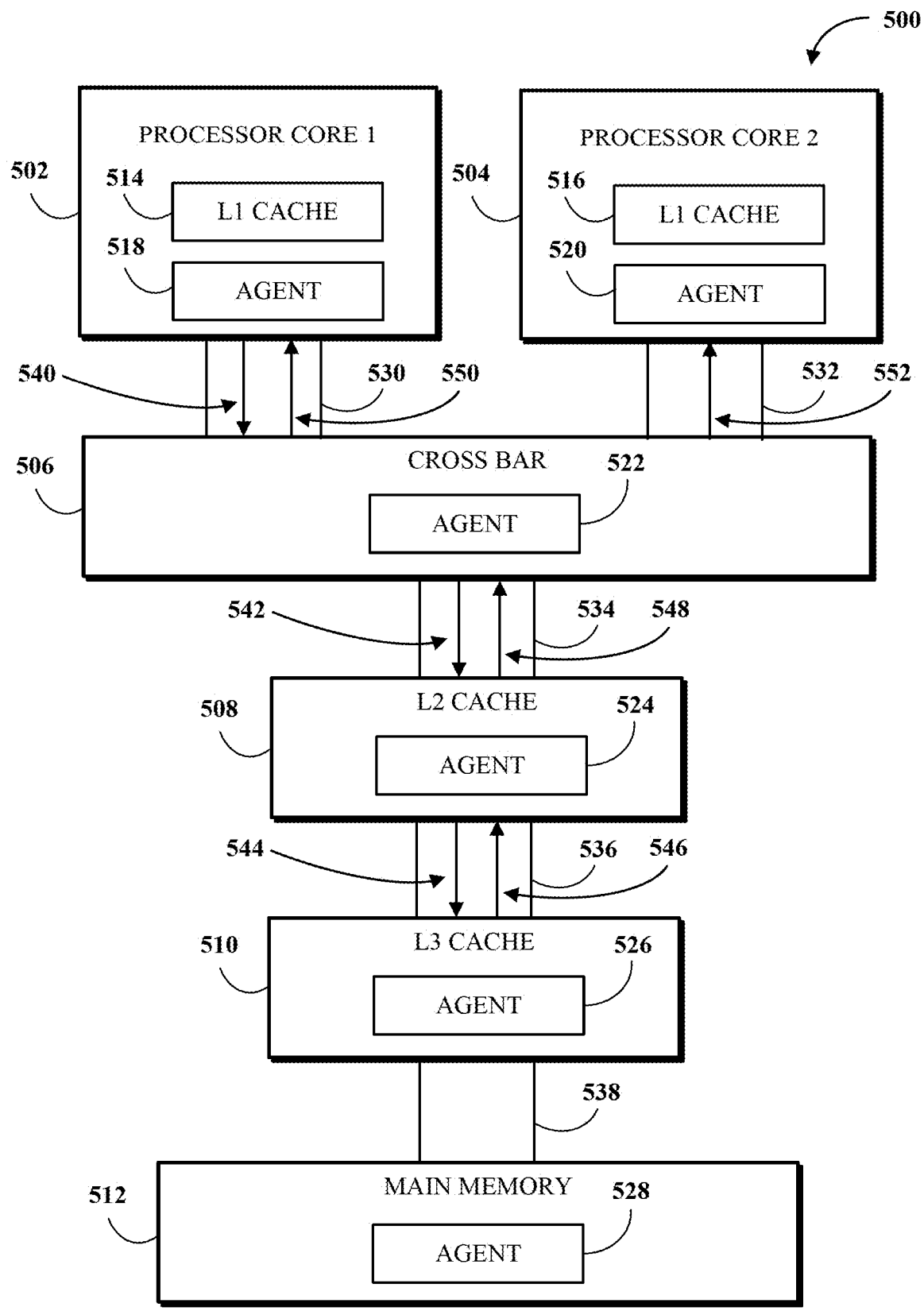
FIG. 5 is a block diagram of an example of a system for downgrading a permission associated with data stored in a cache.

FIG. 5 is a block diagram of an example of a system 500 for downgrading a permission associated with data stored in a cache. The system 500 may include components having agents as described in FIG. 3. The components may be arranged in a memory hierarchy. For example, the components may include a first processor core 502, a second processor core 504, a cross bar 506, an L2 cache 508, an L3 cache 510, and a main memory 512. The first processor core 502 may include an L1 cache 514. The second processor core 504 may include an L1 cache 516. The first processor core 502 and the second processor core 504 may connect to the cross bar 506, the cross bar 506 may connect to the L2 cache 508, the L2 cache 508 may connect to the L3 cache 510, and the L3 cache 510 may connect to the main memory 512. While three levels of cache are shown in a cache hierarchy in the system 500 by way of example, in other implementations, the hierarchy may include more levels of cache (e.g., a level 4 (L4) cache) or fewer levels of cache (e.g., deleting the L3 cache 510). The components could be implemented together in an integrated circuit, such as an SoC. Thus, the cache hierarchy in the system 500 may include a first path including the L1 cache 514, the L2 cache 508, and the L3 cache 510, and a second path including L1 cache 516, the L2 cache 508, and the L3 cache 510.

The first processor core 502 may include an agent 518, the second processor core 504 may include an agent 520, and the cross bar 506 may include an agent 522, like the first processor core 302, the second processor core 304, and the cross bar 306 of FIG. 3, respectively. The L2 cache 508 may include an agent 524, and the L3 cache 510 may include an agent 526, like instances of the cache 308 of FIG. 3. The main memory 512 may include an agent 528, like the memory controller 310 of FIG. 3. The agents 518, 520, 522, 524, 526, and 528 may include circuitry for communicating with one another through links. For example, the agent 518 may communicate with the agent 522 via a link 530, the agent 520 may communicate with the agent 522 via a link 532, the agent 522 may communicate with the agent 524 via a link 534, the agent 524 may communicate with the agent 526 via a link 536, and the agent 526 may communicate with the agent 528 via a link 538. In some implementations, the links 530, 532, 534, 536, and 538 may be like the link 402 of FIG. 4. In some implementations, the links may include a command bus for carrying non-data message fields and a data bus for carrying optional message data payloads (e.g., the agents may communicate messages and data via the message and data busses implemented between them).

A processor core in the system 500 may transmit a cache request (e.g., a CMO message) to a cache in the memory hierarchy to request a downgrade of permissions associated with data stored in the cache. The downgrade could be requested by software that the processor core is executing (e.g., a software controlled technique to evict data from a cache). For example, the first processor core 502, via cache circuitry implemented by agent 518 (an inner agent), may transmit a cache request 540. With additional reference to FIG. 6, the cache request 540 may be directed to the L2 cache 508 to request a downgrade of permissions associated with data stored in the L2 cache 508. For example, the cache request 540 may be to downgrade permissions by flushing or invalidating a cache block or cache line of data stored in the L2 cache 508. The cache request 540 may be generated based on software that the first processor core 502 core is executing (e.g., software initiating the downgrade).

The first processor core 502 may transmit the cache request 540 to the cross bar 506 (e.g., cross bar circuitry implemented by agent 522). As the cache request 540 originates from an inner agent in the hierarchy (e.g., agent 518 of the first processor core 502, being inner relative to agent 522 of the cross bar 506, due to the first processor core 502 being further from the main memory 512), the cache request 540 may be transmitted using a lower priority channel of link 530 (e.g., channel A). For example, the lower priority channel may be associated with read requests and write requests to an outer agent on link 532 (as compared to data transmissions and/or inner agent to outer agent upgrades of permissions associated with data, which may be transmitted using a higher priority channel on link 532). The cache request 540 may be transmitted from an outer interface of agent 518 and may be received by an inner interface of agent 522.

The cache request 540 may cause the cross bar 506, via agent 522, to forward a cache request 542 (e.g., another CMO message) to the L2 cache 508 (e.g., cache circuitry implemented by agent 524). As the cache request 542 originates from an inner agent in the hierarchy (agent 522 of the cross bar 506, being inner relative to agent 524 of the L2 cache 508, due to the cross bar 506 being further from the main memory 512), the cache request 542 may be transmitted using a lower priority channel of link 534 (e.g., channel A). For example, the lower priority channel may be associated with read requests and write requests to an outer agent on link 534 (as compared to data transmissions and/or inner agent to outer agent upgrades of permissions associated with data, which may be transmitted using a higher priority channel on link 534). The cache request 542 may be transmitted from an outer interface of agent 522 and may be received by an inner interface of agent 524.

Figure 6:
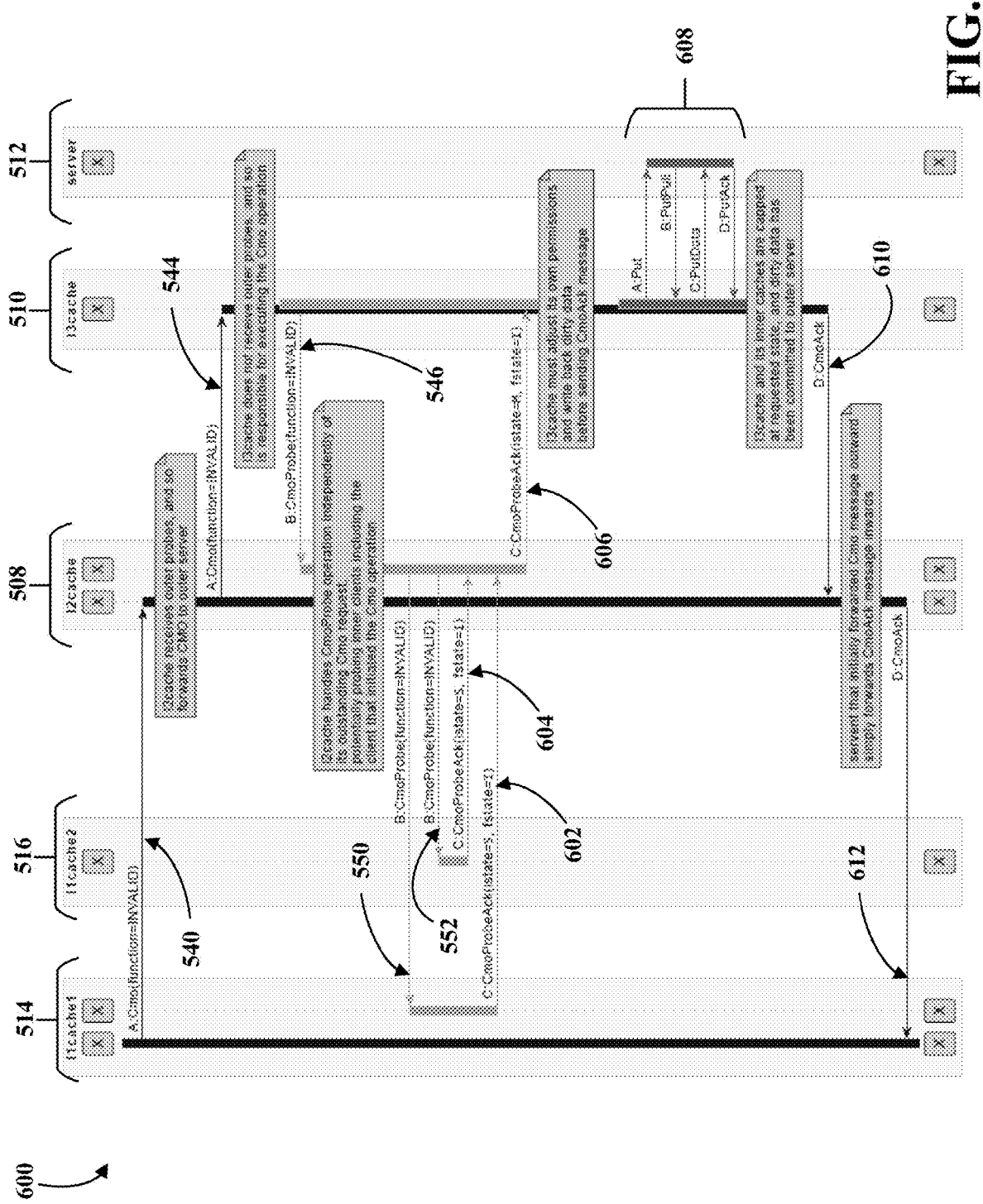
FIG. 6 is a flow diagram of an example of downgrading a permission associated with data stored in a cache.

The L2 cache 508, when receiving the cache request 542 to downgrade a permission associated with data stored in the L2 cache 508, may determine whether the L2 cache 508 is connected to a higher level cache in the memory hierarchy and/or receives probe messages from the higher level cache. For example, the agent 524 may determine that the L2 cache 508 is arranged between L1 caches (e.g., the L1 cache 514 and the L1 cache 516) and the L3 cache 510, and/or that the L2 cache 508 receives probe messages from a higher level cache (e.g., the L3 cache 510). Referring also to FIG. 6, based on determining the L2 cache 508 is connected to a higher level cache and/or receives probe messages from the higher level cache, the L2 cache 508, via agent 524, may forward the cache request as a cache request 544 (e.g., another CMO message) to the L3 cache 510 (e.g., cache circuitry implemented by agent 526). The agent 524 may forward the cache request 544 before downgrading the permission associated with data stored in the L2 cache 508 (without affecting the cache state). As the cache request 544 originates from an inner agent in the hierarchy (agent 524 of the L2 cache 508, being inner relative to agent 526 of the L3 cache 510, due to the L2 cache 508 being further from the main memory 512), the cache request 544 may be transmitted using a lower priority channel of link 536 (e.g., channel A). For example, the lower priority channel may be associated with read requests and write requests to an outer agent on link 536 (as compared to data transmissions and/or inner agent to outer agent upgrades of permissions associated with data, which may be transmitted using a higher priority channel on link 536). The cache request 544 may be transmitted from an outer interface of agent 524 and may be received by an inner interface of agent 526.

The L3 cache 510, when receiving the cache request 544 to downgrade a permission associated with data stored in the L2 cache 508, may also determine whether the L3 cache 510 is connected to a higher level cache in the memory hierarchy and/or receives probe messages from the higher level cache. For example, the agent 526 may determine that the L3 cache 510 is arranged between the L2 cache 508 and the main memory 512, that the L3 cache 510 is a last level cache (LLC), and/or that the L3 cache 510 does not receive probe messages from a higher level cache. Thus, the cache request 540 (from agent 518) propagates through the cache hierarchy without downgrading a permission associated with data stored in a cache. Referring also to FIG. 6, based on determining the L3 cache 510 is not connected to a higher level cache, the L3 cache 510 does not receive probe messages, and/or the L3 cache 510 is an LLC, the cache request 544 may then cause the L3 cache 510, via agent 526, to transmit a cache probe 546 (e.g., a CmoProbe message) to the L2 cache 508 (e.g., cache circuitry implemented by agent 524) to request the downgrade. The cache probe 546 may be designed to cause a downgrade of the permission in multiple caches arranged in the memory hierarchy. The L3 cache 510 may generate the cache probe 546 without forwarding the cache request 544 based on the L3 cache 510 being an LLC. The L3 cache 510 may also generate the cache probe 546 without downgrading any permissions. As the cache probe 546 originates from an outer agent in the hierarchy (agent 526 of the L3 cache 510, being outer relative to agent 524 of the L2 cache 508, due to the L3 cache 510 being closer to the main memory 512), the cache probe 546 may be transmitted using a higher priority channel of link 536 (e.g., channel B). For example, the higher priority channel may be associated with data transmissions and/or inner agent to outer agent upgrades of permissions associated with data on link 536. The cache probe 546 may be transmitted from an inner interface of agent 526 and may be received by an outer interface of agent 524. As a result, a final coherence agent in the memory hierarchy (e.g., agent 526, being a root of the coherence tree, or an outermost agent that is a cache) may transmit a cache probe (e.g., the cache probe 546) that may be propagated in the memory hierarchy back through inner agents for downgrading the permission. The final coherence agent may probe one inner agent (e.g., agent 524) on behalf of the CMO operation initiated by another inner agent (e.g., agent 518).

The L2 cache 508 may process the cache probe 546 independently of the cache request 544 that was sent, probing inner agents including the agent that initiated the cache request in the system 500 (e.g., agent 518) and other inner agents in the coherence tree (e.g., agent 520). The L2 cache 508, when receiving the cache probe 546 to downgrade the permission associated with data stored in the L2 cache 508, may downgrade the permission (e.g., the cache probe 546 may cause the agent 524 to change the cache state of the L2 cache 508). For example, downgrading permissions may include flushing or invalidating a cache block or cache line of data in the L2 cache 508. The cache probe 546 may also cause the L2 cache 508, via agent 524, to transmit a cache probe 548 (e.g., another CmoProbe message) to the cross bar 506 (e.g., cross bar circuitry implemented by agent 522). As the cache probe 548 originates from an outer agent in the hierarchy (agent 524 of the L2 cache 508, being outer relative to agent 522 of the cross bar 506, due to the L2 cache 508 being closer to the main memory 512), the cache probe 548 may be transmitted using a higher priority channel of link 534 (e.g., channel B). For example, the higher priority channel may be associated with data transmissions and/or inner agent to outer agent upgrades of permissions associated with data on link 536. The cache probe 548 may be transmitted from an inner interface of agent 524 and may be received by an outer interface of agent 522.

The cache probe 548 may cause the cross bar 506, via agent 522, to forward the cache probe in the coherence tree, including a cache probe 550 to the L1 cache 514 (e.g., to cache circuitry implemented by agent 518) and a cache probe 552 to the L1 cache 516 (e.g., to cache circuitry implemented by agent 520). As the cache probe 550 originates from an outer agent in the hierarchy (agent 522 of the cross bar 506, being outer relative to agent 518 of the L1 cache 514 and the first processor core 502, due to the cross bar 506 being closer to the main memory 512), the cache probe 550 may be transmitted using a higher priority channel of link 530 (e.g., channel B). For example, the higher priority channel may be associated with data transmissions and/or inner agent to outer agent upgrades of permissions associated with data on link 530. The cache probe 550 may be transmitted from an inner interface of agent 522 and may be received by an outer interface of agent 518. Also, as the cache probe 552 originates from an outer agent in the hierarchy (agent 522 of the cross bar 506, being outer relative to agent 520 of the L1 cache 516 and the second processor core 504, due to the cross bar 506 being closer to the main memory 512), the cache probe 552 may be transmitted using a higher priority channel of link 532 (e.g., channel B). For example, the higher priority channel may be associated with data transmissions and/or inner agent to outer agent upgrades of permissions associated with data on link 532. The cache probe 550 may be transmitted from an inner interface of agent 522 and may be received by an outer interface of agent 520.

The L1 cache 514, when receiving the cache probe 550 to downgrade the permission associated with data stored in the L2 cache 508, may downgrade the permission associated with any data stored in the L1 cache 514 that corresponds to the data to be downgraded in the L2 cache 508 (e.g., the cache probe 550 may cause the agent 518 to change the cache state of the L1 cache 514). For example, downgrading permissions may include flushing or invalidating a cache block or cache line of data in the L1 cache 514. This may include performing a write operation to write dirty data to the L2 cache 508. Referring also to FIG. 6, the L1 cache 514 may also transmit a probe acknowledgement 602 to the L2 cache 508 (via the cross bar 506) after downgrading the permission in the L1 cache 514 to acknowledge the downgrade.

The L1 cache 516, when receiving the cache probe 552 to downgrade the permission associated with data stored in the L2 cache 508, may also downgrade the permission associated with any data stored in the L1 cache 516 that corresponds to the data to be downgraded in the L2 cache 508 (e.g., the cache probe 552 may cause the agent 520 to change the cache state of the L1 cache 516). For example, downgrading permissions may include flushing or invalidating a cache block or cache line of data in the L1 cache 516. This may include performing a write operation to write dirty data to the L2 cache 508. Referring also to FIG. 6, the L1 cache 516 may also transmit a probe acknowledgement 604 to the L2 cache 508 (via the cross bar 506) after downgrading the permission in the L1 cache 516 to acknowledge the downgrade.

The L2 cache 508, via agent 508, may downgrade the permission associated with data stored in the L2 cache 508 in connection with the probe acknowledgement (e.g., the probe acknowledgement 604 and the probe acknowledgement 604, forwarded by the cross bar 506). For example, downgrading permissions may include flushing or invalidating a cache block or cache line of data in the L2 cache 508. This may include performing a write operation to write dirty data to the L3 cache 510. Referring also to FIG. 6, the L2 cache 508 may transmit a probe acknowledgement 606 to the L3 cache 510 after downgrading the permission in the L2 cache 508 to acknowledge the downgrade. The probe acknowledgement 606 may cause the L3 cache 510, via agent 526, to downgrade the permission associated with any data stored in the L3 cache 510 that corresponds to the data downgraded in the L2 cache 508. For example, downgrading permissions may include flushing or invalidating a cache block or cache line of data in the L3 cache 510. As the LLC, this may include performing a write operation 608 to write dirty data to the main memory 512. After the write operation 608, the L3 cache 510 may transmit a final cache request acknowledgment 610 (e.g., a CMO acknowledgment message, or CmoAck) to the L2 cache 508. The L2 cache 508 may then transmit a final cache request acknowledgment 612 (e.g., another CmoAck), via the cross bar 506, to the L1 cache associated with the agent that initiated the cache request in the system 500 (e.g., the L1 cache 514 associated with the agent 518). By downgrading permissions using messages transmitted on the higher priority channels toward inner agents (and upgrading permissions using messages transmitted on the lower priority channels toward outer agents), state machine logic implemented by the caches may be simplified.

Thus, a CMO (e.g., cache request 540) may cause caches to move or modify data and permissions as requested. The CMO may be transmitted to cacheable memory regions and may be intercepted by agents associated with caches (e.g., agent 524 and agent 526). With additional reference to FIG. 7, a table 700 describes functions that may be supported for a CMO, including exclusive, shared, invalid, and discard functions. The exclusive function may direct dirty data to be written toward memory, and caches to not hold permissions outside of exclusive, shared, or invalid. The shared function may direct dirty data to be written toward memory, and caches to not hold permissions outside of shared or invalid. The invalid function may direct dirty data to be written toward memory, and caches to not hold permissions outside of invalid. The discard function may direct dirty data to be discarded or written toward memory, and caches to not hold permissions outside of invalid.

A CMO (e.g., cache request 540) may be initiated by a client (e.g., agent 518, having a client interface) transmitting a CMO message. The CMO message may include the address and the size of the CMO. With additional reference to FIG. 8, a table 802 describes fields of a CMO message. A server (e.g., agent 526, having a server interface) may respond with a CMO acknowledgment message (CmoAck, such as cache request acknowledgment 610) that indicates that the CMO has completed. Further, a table 804 describes fields of the CMO acknowledgment message. The size in a CMO message may be a supported transfer size of the cache servent by which it is next received. An agent issuing a CMO message may use properties of the address to determine an allowed sizes. If a logical client initiates Fill and CMO operations, the client may use the same size for CMO that it uses for Fill.

When receiving a CMO on an inner interface, an agent that receives cache probe on an outer interface (e.g., agent 524) may forward the CMO outward. An agent that terminates the cache hierarchy (e.g., agent 526) may be responsible for completing the CMO. Such a server (e.g., agent 526) may ensure that, if caused by a CMO, the server extracts dirty data from the server's inner caches (e.g., inner agents, such as agent 518, agent 520, and agent 524) and pushes that data to the server's outer server (e.g., agent 528 associated with the main memory 512). The server may also ensure that the server reduces the permissions of its inner caches (e.g., inner agents, such as agent 518, agent 520, and agent 524) to comply with a limit caused by the CMO.

A server (e.g., agent 526) executing a CMO may complete other operations to achieve the foregoing conditions. For example, the server may initiate one or more probe operations on its server interface to clients inwards from the server. The server may initiate a Put operation on its client interface to another server outwards from the server. The server may respond with a CmoAck message after outer data updates and/or inner cache state transitions are committed.

In some implementations, a system (e.g., the system 500) may ensure that an acknowledgement message for an outer non-coherent update that may result from servicing a CMO may be withheld until dirty data has achieved a system-level propagation from a CMO. In some cases, a CMO may be denied by a server. For example, such a response could mean that while the CMO was publicly ordered in the system, an architectural state of a cache block in the cache hierarchy is implementation specific. In some implementations, a CmoAck message may communicate both ordering and completion of a CMO operation. When a CMO operation is completed, results become visible to the entire system, even when operating on cached devices. In some implementations, receipt of CmoAck may resolve a client's CMO address hazard. A client may initiate a CMO from any cache state. A CMO may cause an outer coherence agent to probe an inner coherence agent on behalf of an operation initiated by the inner coherence agent.

Figure 9:
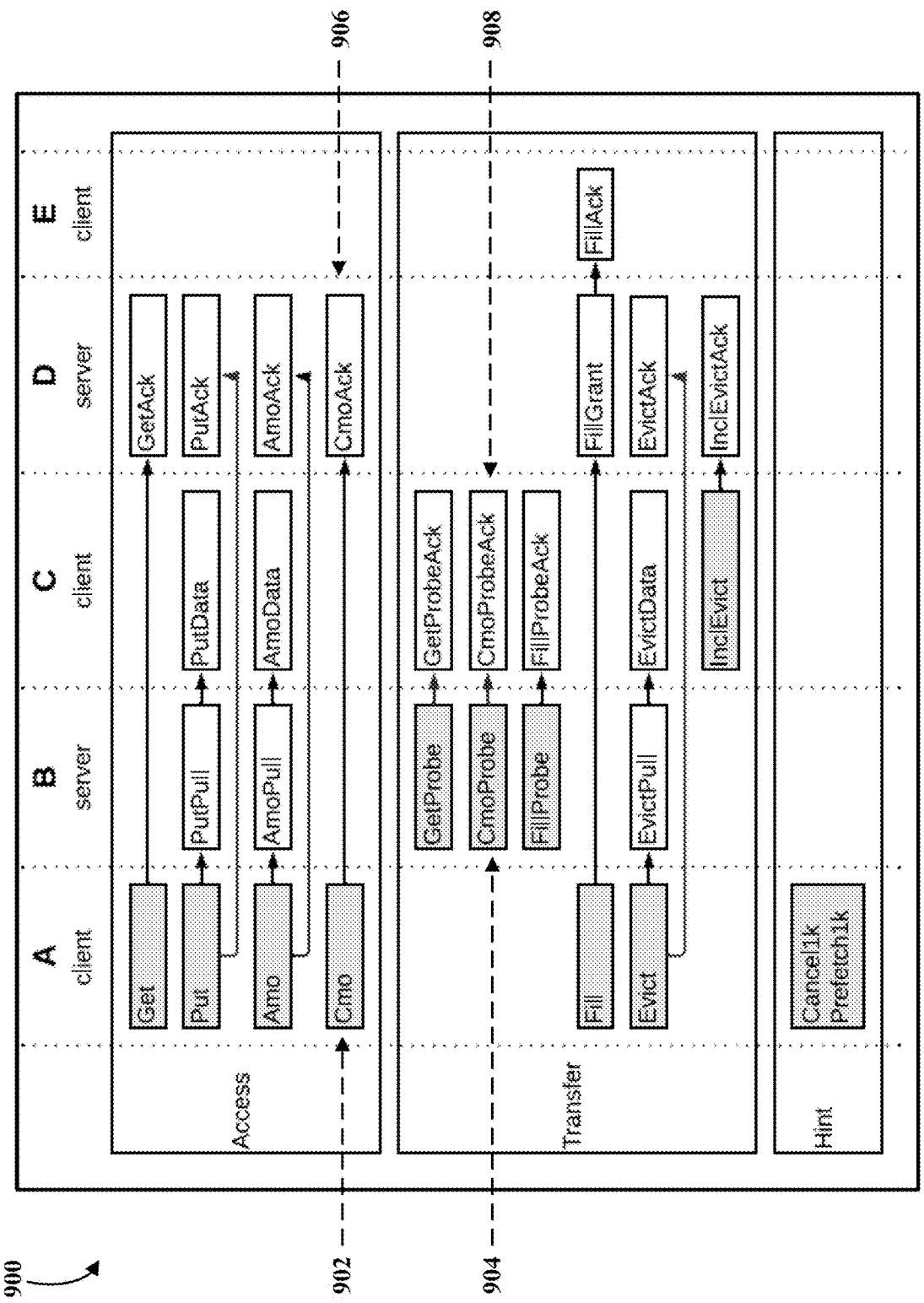
FIG. 9 is a diagram of an example of messages and operations that may be communicated between agents.

FIG. 9 is a diagram of an example of messages that may be communicated between agents. The messages may be communicated through links, such as the links 314, 316, 318, 320, and 322 shown in FIG. 3, the link 402 shown in FIG. 4, and the links 530, 532, 534, 536, and 538 shown in FIG. 5. The messages may be communicated between agents having client interfaces and server interfaces, such as agents implemented by the first processor core 302, the second processor core 304, the cross bar 306, the cache 308, the memory controller 310, and the memory-mapped device 312 shown in FIG. 3, agents implemented by the components 406 and 410 shown in FIG. 4, and the first processor core 502, the second processor core 504, the cross bar 506, the L2 cache 508, the L3 cache 510, and the main memory 512 shown in FIG. 5.

The messages may be communicated through channels associated with priorities, such as the Channels A, B, C, D, and E shown in columns, having prioritization of Channels A<B<C<D<E for messages across the channels, as shown in FIG. 4. For example, an agent having a client interface (e.g., a client agent) may send a message having a lowest priority via Channel A. An agent having a server interface (e.g., a server agent) may send a message having a next lowest priority via Channel B (e.g., having a higher priority than Channel A). The agent having the client interface (e.g., the client agent) may send a message having a next lowest priority via Channel C (e.g., having a higher priority than Channels A and B). The agent having the server interface (e.g., the server agent) may send a message having a next lowest priority via Channel D (e.g., having a higher priority than Channels A, B, and C). The agent having the client interface (e.g., the client agent) may send a message having a highest priority via Channel E (e.g., having a higher priority than Channels A, B, C, and D). Some agents may have a client interface and a server interface and therefore may function as a server at times and a client at times (e.g., the agent may be a servent, such as the agent 522 shown in FIG. 5).

A box in a column of the diagram 900 may indicate a possible message sent by an agent through a channel corresponding to the column including the box. For example, a box 902 labeled "CMO" may indicate a CMO message (e.g., cache request 540) that may be sent by a client agent via Channel A. In another example, a box 904 labeled "Cmo-Probe" may indicate a CMO probe message (e.g., cache probe 546) that may be sent by a server agent via Channel B. A series of boxes in columns of the diagram 800 may indicate a possible operation between agents, comprising a sequence of multiple messages, communicated through a given link using multiple channels. For example, a box 906 labeled "CmoAck" may indicate a CMO acknowledgement message (e.g., cache request acknowledgment 610) that may be sent by a server agent via Channel D. In another example, a box 908 labeled "CmoProbeAck" may indicate a CMO probe acknowledgement message (e.g., probe acknowledgement 602) that may be sent by a client agent via Channel C.

In the diagram 900, channel A may be associated with upgrading permissions. For example, a "Fill" may cause an upgrade of permissions associated with data stored in a cache. In another example, a "Get," associated with a read request, may also cause an upgrade of permissions associated with data stored in a cache. In another example, a "Put," associated with a write request, may also cause an upgrade of permissions associated with data stored in a cache. Channel B may be associated with downgrading permissions. For example, a "Get Probe" and "CMO Probe" may cause a downgrade of permissions (e.g., transitioning from exclusive ownership of a cache line to shared ownership of the cache line, or invalidating the cache line).

Implementations of this disclosure enable maintaining channel A as a path for upgrading permissions and channel B as another path for downgrading permissions. State machines that are operating on channel A may be simplified by responding to fewer requests. Instead of downgrading permission via state machines that respond to channel A requests, downgrading permission may be processed by state machines that respond to channel B requests, similar to their existing processing of other channel B requests (e.g., "Get Probe").

Figure 10:
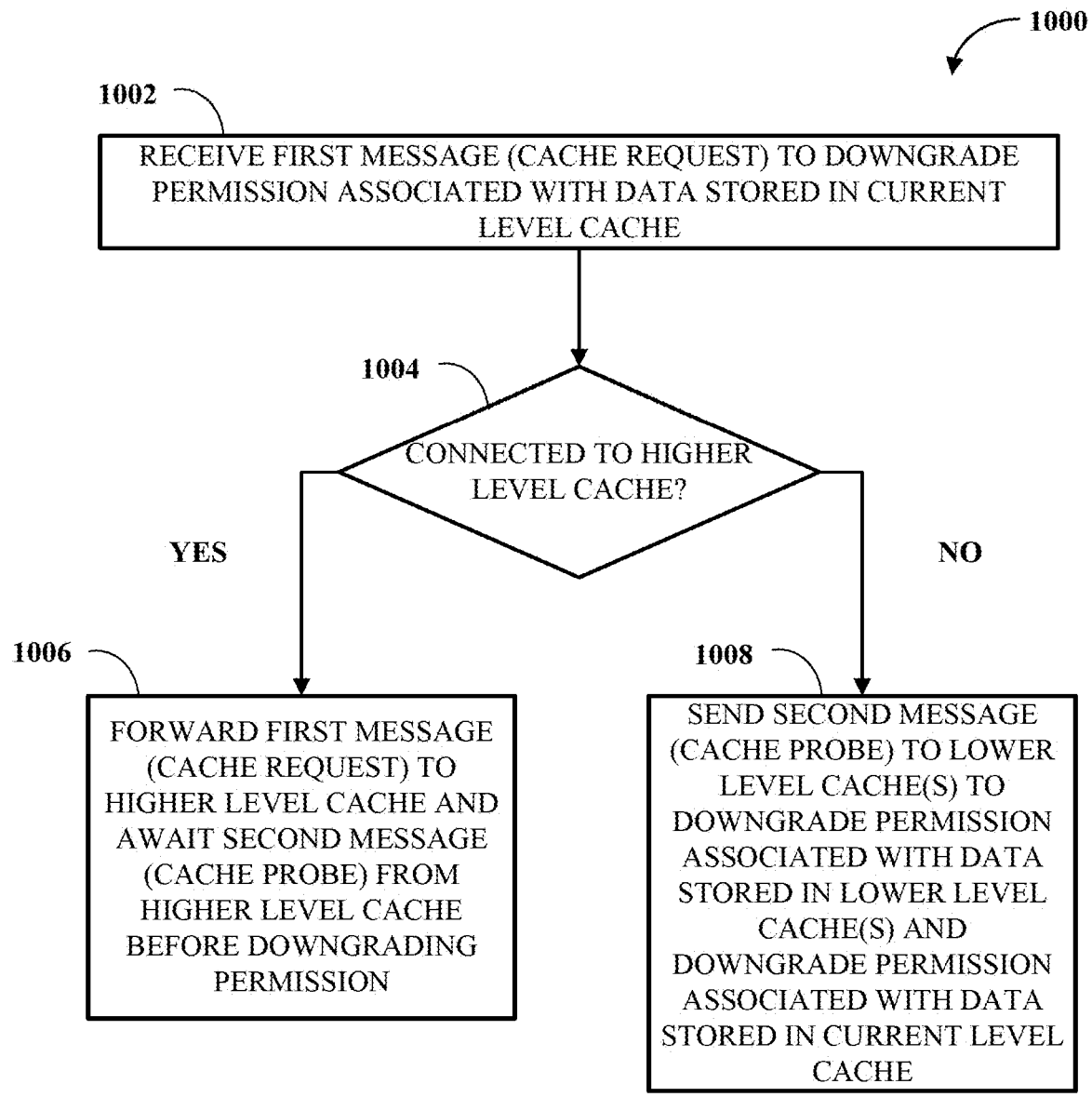
FIG. 10 is a flow chart of an example of a technique for downgrading a permission associated with data stored in a cache.

To further describe some implementations in greater detail, reference is next made to examples of techniques which may be performed using a cache. FIG. 10 is a flow chart of an example of a technique 1000 for downgrading a permission associated with data stored in a cache. The technique 1000 can be performed, for example, using the systems, hardware, and software described with respect to FIGS. 1-9. The steps, or operations, of the technique 1000 or another technique, method, process, or algorithm described in connection with the implementations disclosed herein can be implemented directly in hardware, firmware, software executed by hardware, circuitry, or a combination thereof. For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, cache circuitry may receive a first message to downgrade a permission associated with data stored in a current level cache. For example, cache circuitry implemented by agent 524, associated with the L2 cache 508, may receive the first message (e.g., the cache request 542) to downgrade a permission associated with data stored in the L2 cache 508. In another example, cache circuitry implemented by agent 526, associated with the L3 cache 510, may receive the first message (e.g., the cache request 544) to downgrade a permission associated with data stored in the L3 cache 510.

The cache circuitry may receive the first message from a lower level cache. In some cases, the cache circuitry may receive the first message from a processor core having an L1 cache, such as the first processor core 502 having the L1 cache 514 (transmitted via cache circuitry implemented by the agent 518), or the second processor core 504 having the L1 cache 516 (transmitted via cache circuitry implemented by the agent 520. The cache circuitry may receive the first message using a lower priority channel (e.g., channel A) of a server interface (e.g., the server interface of the cache 308, which could be an inner interface of the L2 cache 508, or an inner interface of the L3 cache 510).

At 1004, the cache circuitry may determine if it is connected to a higher level cache. If the cache circuitry is connected to a higher level cache ("Yes"), at 1006 the cache circuitry may forward the first message to the higher level cache and await a second message from the higher level cache before downgrading the permission associated with data stored in the current level cache. The cache circuitry may forward the first message before downgrading the permission. The cache circuitry may downgrade the permission after receiving the second message from the higher level cache. The second message may be designed to cause downgrade of the permission in multiple levels of cache arranged in the memory hierarchy. For example, cache circuitry implemented by agent 524, associated with the L2 cache 508, is connected to a higher level cache (e.g., the L3 cache 510). As a result, the cache circuitry implemented may forward the first message (e.g., the cache request 544) to the L3 cache 510 and await the second message (e.g., the cache probe 546) from the L3 cache 510 before downgrading the permission associated with data stored in the L2 cache 508. The cache circuitry may forward the first message (e.g., the cache request 544) before downgrading the permission associated with data stored in the L2 cache 508, and may downgrade the permission associated with data stored in the L2 cache 508 after receiving the second message (e.g., the cache probe 546) from the L3 cache 510. The cache circuitry may forward the first message using a lower priority channel (e.g., channel A) of a client interface (e.g., the client interface of the cache 308, which could be an outer interface of the L2 cache 508, connected to the L3 cache 510). The cache circuitry may await the second message using a higher priority channel (e.g., channel B) of the client interface.

However, at 1004, if the cache circuitry is not connected to a higher level cache ("No"), at 1008 the cache circuitry may send a second message to lower level cache(s) to downgrade the permission associated with data stored in the lower level cache(s). The cache circuitry may downgrade the permission associated with data stored in the current level cache, which could be based on acknowledgements from the lower level cache(s). The second message may be designed to cause downgrade of the permission in multiple levels of cache arranged in the memory hierarchy. Downgrading the permission may include flushing or invalidating data stored in the cache. The higher level cache may generate the second message without forwarding the first message based on the higher level cache being an LLC. For example, the cache circuitry implemented by agent 526, associated with the L3 cache 510, is not connected to a higher level cache (e.g., the L3 cache 510 is an LLC). As a result, the cache circuitry may send the second message (e.g., the cache probe 546) to lower level cache(s) (e.g., the L2 cache 508, the L1 cache 514, and the L1 cache 516) to downgrade the permission associated with data stored in the lower level cache(s). The cache circuitry may downgrade the permission associated with data stored in the L3 cache 510 following acknowledgments from the lower level cache(s). The cache circuitry implemented may generate the second message without forwarding the first message based on the L3 cache 510 being an LLC. The cache circuitry may send the second message using a higher priority channel (e.g., channel B) of a server interface (e.g., the server interface of the cache 308, which could be the inner interface of the L3 cache 510, connected to the L2 cache 508).

Figure 11:
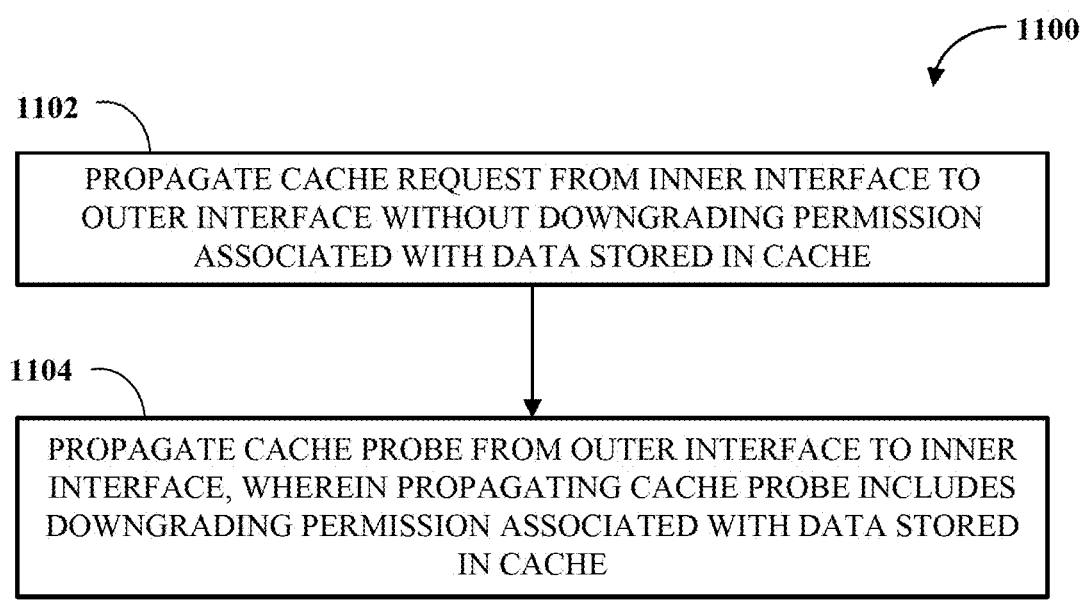
FIG. 11 is a flow chart of an example of another technique for downgrading a permission associated with data stored in a cache.

FIG. 11 is a flow chart of another example of a technique 1100 for downgrading a permission associated with data stored in a cache. The technique 1100 can be performed, for example, using the systems, hardware, and software described with respect to FIGS. 1-9. The steps, or operations, of the technique 1100 or another technique, method, process, or algorithm described in connection with the implementations disclosed herein can be implemented directly in hardware, firmware, software executed by hardware, circuitry, or a combination thereof. For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, cache circuitry may propagate a cache request from an inner interface to an outer interface without downgrading a permission associated with data stored in a cache. For example, cache circuitry implemented by agent 524, associated with the L2 cache 508, may propagate the cache request 542 from an inner interface (e.g., a server interface of the L2 cache 508, which could be the interface of the L2 cache 508 that is connected to the cross bar 506) to an outer interface (e.g., a client interface of the L2 cache 508, which could be the interface of the L2 cache 508 that is connected to the L3 cache 510) without downgrading a permission associated with data stored in the L2 cache 508.

At 1104, the cache circuitry may propagate a cache probe from the outer interface to the inner interface. Propagating the cache probe may include downgrading the permission associated with data stored in the cache. For example, cache circuitry implemented by agent 524, associated with the L2 cache 508, may propagate the cache probe 546 from the outer interface (e.g., the client interface of the L2 cache 508, connected to the L3 cache 510) to the inner interface (e.g., the server interface of the L2 cache 508, connected to the cross bar 506). Propagating the cache probe 546 may include downgrading the permission associated with data stored in the L2 cache 508. Downgrading the permission may include flushing or invalidating data stored in the L2 cache 508.

Some implementations may include an apparatus comprising cache circuitry configured to receive a first message to downgrade a permission associated with data stored in a current level cache; forward the first message to a higher level cache; and downgrade the permission associated with data stored in the current level cache based on receiving a second message from the higher level cache, wherein the cache circuitry forwards the first message before downgrading the permission. In some implementations, the second message is designed to cause downgrade of the permission in multiple caches arranged in a memory hierarchy. In some implementations, the current level cache is an L2 cache, the higher level cache is an L3 cache, and the cache circuitry is configured to receive the first message from a processor core having an L1 cache. In some implementations, the cache circuitry implements an agent that receives the first message from another agent that is implemented by a processor core. In some implementations, the cache circuitry receives the first message using a lower priority channel of a server interface, forwards the first message using a lower priority channel of a client interface, and receives the second message using a higher priority channel of the client interface. In some implementations, the second message originates from an LLC. In some implementations, the first message is a cache maintenance operation message, and the second message is a probe message. In some implementations, the higher level cache generates the second message without forwarding the first message based on the higher level cache being an LLC. In some implementations, downgrading the permission comprises at least one of flushing or invalidating the data stored in the current level cache. In some implementations, the cache circuitry implements an agent configured to transmit a third message to another agent that transmitted the first message after the agent downgrades the permission to acknowledge the downgrade.

Some implementations may include a method comprising receiving a first message to downgrade a permission associated with data stored in a current level cache; forwarding the first message to a higher level cache; and downgrading the permission associated with data stored in the current level cache based on receiving a second message from the higher level cache, wherein the first message is forwarded before downgrading the permission. In some implementations, the second message is designed to cause downgrade of the permission in multiple caches arranged in a memory hierarchy. In some implementations, the current level cache is an L2 cache, the higher level cache is an L3 cache, and the first message is received from a processor core having an L1 cache. In some implementations, the current level cache includes cache circuitry that implements an agent that receives the first message from another agent that is implemented by a processor core. In some implementations, the current level cache includes cache circuitry that receives the first message using a lower priority channel of a server interface, forwards the first message using a lower priority channel of a client interface, and receives the second message using a higher priority channel of the client interface. In some implementations, the second message originates from an LLC. In some implementations, the first message is a cache maintenance operation message, and the second message is a probe message. In some implementations, the higher level cache generates the second message without forwarding the first message based on the higher level cache being an LLC. In some implementations, downgrading the permission comprises at least one of flushing or invalidating the data stored in the current level cache. In some implementations, the current level cache includes cache circuitry that implements an agent that transmits a third message to another agent that transmitted the first message after the agent downgrades the permission to acknowledge the downgrading.

Some implementations may include a non-transitory computer readable medium comprising a circuit representation that, when processed by a computer, is used to program or manufacture an integrated circuit comprising cache circuitry configured to receive a first message to downgrade a permission associated with data stored in a current level cache; forward the first message to a higher level cache; and downgrade the permission associated with data stored in the current level cache based on receiving a second message from the higher level cache, wherein the cache circuitry forwards the first message before downgrading the permission. In some implementations, the second message is designed to cause downgrade of the permission in multiple caches arranged in a memory hierarchy. In some implementations, the current level cache is an L2 cache, the higher level cache is an L3 cache, and the cache circuitry is configured to receive the first message from a processor core having an L1 cache. In some implementations, the cache circuitry implements an agent that receives the first message from another agent that is implemented by a processor core. In some implementations, the cache circuitry receives the first message using a lower priority channel of a server interface, forwards the first message using a lower priority channel of a client interface, and receives the second message using a higher priority channel of the client interface. In some implementations, the second message originates from an LLC. In some implementations, the first message is a cache maintenance operation message, and the second message is a probe message. In some implementations, the higher level cache generates the second message without forwarding the first message based on the higher level cache being an LLC. In some implementations, downgrading the permission comprises at least one of flushing or invalidating the data stored in the current level cache. In some implementations, the cache circuitry implements an agent configured to transmit a third message to another agent that transmitted the first message after the agent downgrades the permission to acknowledge the downgrade.

Some implementations may include a non-transitory computer readable medium comprising a circuit representation that, when processed by a computer, is used to program or manufacture an integrated circuit comprising cache circuitry configured to propagate a cache request from an inner interface to an outer interface without downgrading a permission associated with data stored in a cache; and propagate a cache probe from the outer interface to the inner interface, wherein propagating the cache probe includes downgrading the permission associated with data stored in the cache. In some implementations, the cache probe is designed to cause downgrade of the permission in multiple caches arranged in a memory hierarchy. In some implementations, the cache is an L2 cache that propagates the cache request to an L3 cache and propagates the cache probe to an L1 cache. In some implementations, the cache circuitry implements an agent that receives the cache request from another agent that is implemented by a processor core. In some implementations, the cache circuitry receives the cache request using a lower priority channel of the inner interface, propagates the cache request using a lower priority channel of the outer interface, and receives the cache probe using a higher priority channel of the outer interface. In some implementations, the cache probe originates from an LLC. In some implementations, the cache request is a cache maintenance operation message from a processor core. In some implementations, a higher level cache generates the cache probe without forwarding the cache request based on the higher level cache being an LLC. In some implementations, downgrading the permission comprises at least one of flushing or invalidating the data stored in the cache. In some implementations, the cache circuitry is configured to respond to the cache request, using the inner interface, once the propagating of the cache request and the propagating of the cache probe are complete.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus comprising:
   cache circuitry configured to:
   receive, by using a first channel of a server interface, a first message to downgrade a permission associated with data stored in a current level cache;
   forward, by using a second channel of a client interface, the first message to a higher level cache;
   receive, by using a third channel of the client interface, a second message from the higher level cache; and
   downgrade the permission associated with the data stored in the current level cache based on receiving the second message,
   wherein the cache circuitry is further configured to forward the first message before downgrading the permission, and
   wherein a priority of each of the first channel and the second channel is lower than a priority of the third channel.

2. The apparatus of claim 1, wherein the second message is designed to cause downgrade of the permission in multiple caches arranged in a memory hierarchy.

3. The apparatus of claim 1, wherein the current level cache is a level two (L2) cache, the higher level cache is a level three (L3) cache, and the cache circuitry is configured to receive the first message from a processor core having a level one (L1) cache.

4. The apparatus of claim 1, wherein the cache circuitry implements an agent that receives the first message from another agent that is implemented by a processor core.

5. The apparatus of claim 1, wherein the higher level cache generates the second message without forwarding the first message based on the higher level cache being a last level cache (LLC).

6. The apparatus of claim 1, wherein downgrading the permission comprises at least one of flushing or invalidating the data stored in the current level cache.

7. The apparatus of claim 1, wherein the cache circuitry implements an agent configured to transmit a third message to another agent that transmitted the first message after the agent downgrades the permission to acknowledge the downgrade.

8. A method comprising:
receiving a first message to downgrade a permission associated with data stored in a current level cache;
forwarding the first message to a higher level cache; and
downgrading the permission associated with the data stored in the current level cache based on receiving a second message from the higher level cache, wherein the first message is forwarded before downgrading the permission,
wherein the current level cache includes cache circuitry that receives the first message using a first channel of a server interface, forwards the first message using a second channel of a client interface, and receives the second message using a third channel of the client interface, and
wherein a priority of each of the first channel and the second channel is lower than a priority of the third channel.

9. The method of claim 8, wherein the first message is a cache maintenance operation message, and the second message is a probe message.

10. The method of claim 8, wherein the second message is designed to cause downgrade of the permission in multiple caches arranged in a memory hierarchy.

11. The method of claim 8, wherein downgrading the permission comprises at least one of flushing or invalidating the data stored in the current level cache.

12. A non-transitory computer readable medium comprising a circuit representation that, when processed by a computer, is used to program or manufacture an integrated circuit comprising:
cache circuitry configured to:
receive, by using a first channel of a server interface, a first message to downgrade a permission associated with data stored in a current level cache;
forward, by using a second channel of a client interface, the first message to a higher level cache;
receive, by using a third channel of the client interface, a second message from the higher level cache; and
downgrade the permission associated with the data stored in the current level cache based on receiving the second message from the higher level cache,
wherein the cache circuitry is further configured to forward the first message before downgrading the permission, and
wherein a priority of each of the first channel and the second channel is lower than a priority of the third channel.

13. The non-transitory computer readable medium of claim 12, wherein the second message is designed to cause downgrade of the permission in multiple caches arranged in a memory hierarchy.

14. The non-transitory computer readable medium of claim 12, wherein the current level cache is an L2 cache, the higher level cache is an L3 cache, and the cache circuitry is configured to receive the first message from a processor core having an L1 cache.

15. The non-transitory computer readable medium of claim 12, wherein the cache circuitry implements an agent that receives the first message from another agent that is implemented by a processor core.

16. The non-transitory computer readable medium of claim 12, wherein the second message originates from an LLC.

17. The non-transitory computer readable medium of claim 12, wherein the first message is a cache maintenance operation message, and the second message is a probe message.

18. The non-transitory computer readable medium of claim 12, wherein the higher level cache generates the second message without forwarding the first message based on the higher level cache being an LLC.

19. The non-transitory computer readable medium of claim 12, wherein downgrading the permission comprises at least one of flushing or invalidating the data stored in the current level cache.

20. The non-transitory computer readable medium of claim 12, wherein the cache circuitry implements an agent configured to transmit a third message to another agent that transmitted the first message after the agent downgrades the permission to acknowledge the downgrade.

* * * * *